(12) United States Patent
Weber et al.

(10) Patent No.: US 10,402,970 B2
(45) Date of Patent: Sep. 3, 2019

(54) MODEL-BASED SEGMENTATION OF AN ANATOMICAL STRUCTURE

(71) Applicant: KONINKLIJKE PHILIPS N.V., Eindhoven (NL)

(72) Inventors: Frank Michael Weber, Hamburg (DE); Christian Buerger, Hamburg (DE); Niels Nijhof, Utrecht (NL); Philippe Paul Mazouer, Veldhoven (NL); Irina Waechter-Stehle, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/527,180

(22) PCT Filed: Nov. 13, 2015

(86) PCT No.: PCT/EP2015/076495
§ 371 (c)(1),
(2) Date: May 16, 2017

(87) PCT Pub. No.: WO2016/083147
PCT Pub. Date: Jun. 2, 2016

(65) Prior Publication Data
US 2017/0337680 A1 Nov. 23, 2017

(30) Foreign Application Priority Data

Nov. 28, 2014 (EP) .................................... 14195386

(51) Int. Cl.
*G06T 7/00* (2017.01)
*G06T 7/149* (2017.01)

(52) U.S. Cl.
CPC ............ *G06T 7/0012* (2013.01); *G06T 7/149* (2017.01); *G06T 2207/10116* (2013.01);
(Continued)

(58) Field of Classification Search
CPC combination set(s) only.
See application file for complete search history.

(56) References Cited

U.S. PATENT DOCUMENTS

| 8,233,691 B2 * | 7/2012 | Barschdorf | ............ G06T 7/251 |
| | | | 382/131 |
| 8,260,586 B2 * | 9/2012 | Ecabert | .................... G06T 7/149 |
| | | | 345/419 |

(Continued)

FOREIGN PATENT DOCUMENTS

| WO | 2006117719 A2 | 11/2006 |
| WO | 2007034425 A2 | 3/2007 |

(Continued)

OTHER PUBLICATIONS

Ecabert, O. et al., "Automatic Model-based Segmentation of the Heart in CT Images". IEEE Transactions on Medical Imaging 2008, 27(9), pp. 1189-1201.

(Continued)

*Primary Examiner* — Anand P Bhatnagar

(57) ABSTRACT

A system and method is provided for performing a model-based segmentation of a medical image which only partially shows an anatomical structure. In accordance therewith, a model is applied to the image data of the medical image, the model-based segmentation providing an adapted model having a first model part having been adapted to the first part of the anatomical structure in the medical image of the patient, and a second model part representing the second part of the anatomical structure not having been adapted to a corresponding part of the medical image. Metadata is generated which identifies the first model part to enable the first model part to be distinguished from the second model part in a further processing of the adapted model. Advantageously, the metadata can be used to generate an output image which visually indicates to the user which part of the model has (Continued)

been personalized and which part of the model has not been personalized. Other advantageous uses of the metadata in the further processing of the adapted model have also been conceived.

15 Claims, 5 Drawing Sheets

(52) U.S. Cl.
CPC ............... *G06T 2207/10132* (2013.01); *G06T 2207/20128* (2013.01); *G06T 2207/30048* (2013.01)

(56) References Cited

U.S. PATENT DOCUMENTS

| | | | |
|---|---|---|---|
| 8,463,006 B2 | 6/2013 | Prokoski et al. | |
| 10,002,420 B2* | 6/2018 | Groth | G06T 7/12 |
| 2004/0254439 A1 | 12/2004 | Fowkes et al. | |
| 2005/0220265 A1* | 10/2005 | Besson | A61B 6/032 |
| | | | 378/16 |
| 2008/0187193 A1* | 8/2008 | Hoctor | A61B 8/00 |
| | | | 382/128 |
| 2010/0098309 A1* | 4/2010 | Graessner | G06K 9/00 |
| | | | 382/131 |
| 2010/0191541 A1* | 7/2010 | Prokoski | A61B 5/0064 |
| | | | 705/2 |
| 2010/0286995 A1* | 11/2010 | Pekar | G06Q 50/22 |
| | | | 705/2 |
| 2012/0082354 A1* | 4/2012 | Peters | G06T 7/60 |
| | | | 382/128 |
| 2012/0189185 A1* | 7/2012 | Chen | G06T 7/0083 |
| | | | 382/131 |
| 2013/0266230 A1* | 10/2013 | Peters | G06T 7/0046 |
| | | | 382/224 |
| 2015/0302638 A1 | 10/2015 | Jago et al. | |
| 2015/0335304 A1* | 11/2015 | Lavi | G06F 19/321 |
| | | | 600/407 |
| 2016/0307331 A1* | 10/2016 | Mollus | G06T 7/344 |

FOREIGN PATENT DOCUMENTS

| | | |
|---|---|---|
| WO | 2012123852 A1 | 9/2012 |
| WO | 2013088326 A2 | 6/2013 |
| WO | 2014080319 A1 | 5/2014 |

OTHER PUBLICATIONS

Linte, C.A. et al., Virtual Reality-Enhanced Ultrasound Guidance for Atrial Ablation: In Vitro Epicardial Study, Medical Image Computing and Computer-Assisted Intervention—MICCAI 2008, Lecture Notes in Computer Science, vol. 11, No. 1 (2008), pp. 644-651.

Kass, M et al., "Snakes: Active Contour Models", International Journal of Computer Vision, Dordrecht, NL, (1988), pp. 321-331.

Cuadra, M. et al., "Model-based Segmentation and Fusion of 3D Computed Tomography and 3D Ultrasound of the Eye for Radiotherapy Planning". Jan. 2009 • International Journal of Radiation OncologyBiologyPhysics.

Weese, J. et al., "Shape Constrained Deformable Models for 3D Medical Image Segmentation", Hamburg, Germany, 2001.

Kiss et al: "Augmented Reality Based Tools for Echocardiographic Acquisitions"; 2014 IEEE International Ultrasonics Symposium Proceedings, pp. 695-698.

* cited by examiner

MODEL-BASED SEGMENTATION OF AN ANATOMICAL STRUCTURE

CROSS-REFERENCE TO PRIOR APPLICATIONS

This application is the U.S. National Phase application under 35 U.S.C. § 371 of International Application No. PCT/EP2015/076495, filed on Nov. 13, 2015, which claims the benefit of European Patent Application No. 14195386.9, filed on Nov. 28, 2014. This application is hereby incorporated by reference herein.

FIELD OF THE INVENTION

The invention relates to a system and a method for performing a model-based segmentation of an anatomical structure in a medical image. The invention further relates to a workstation and imaging apparatus comprising the system and to a computer program product comprising instructions for causing a processor system to perform the method.

BACKGROUND OF THE INVENTION

Robust automatic segmentation of various anatomical structures in a medical image is a key enabler in improving clinical workflows. Here, the term segmentation refers to the identification of the anatomical structure in the medical image by, e.g., delineation of the boundaries of the anatomical structure, by labeling of the voxels enclosed by the boundaries, etc. Once such segmentation has been performed, it is possible to extract clinical parameters such as, in case of, e.g., a cardiac structure, ventricular mass, ejection fraction and wall thickness. Additionally or alternatively, the segmentation may be presented to a user for enabling the user to gather clinical or anatomical information from the segmentation.

It is known to segment an anatomical structure in a medical image using a model. Such type of segmentation is also referred to as model-based segmentation. The model may be defined by model data. The model data may define a geometry of the anatomical structure, e.g., in the form of a multi-compartmental mesh of triangles. Inter-patient and inter-disease-stage shape variability may be modeled by assigning an affine transformation to each part of the model. Affine transformations cover translation, rotation, scaling along different coordinate axes and shearing. Moreover, mesh regularity may be maintained by interpolation of the affine transformations at the transitions between different parts of the model. Such affine transformations are often used as a component in so-termed 'deformable' models.

The applying of a model to the image data of the medical image may involve an adaptation technique, also termed 'mesh adaptation' in case of a mesh-based model. Such applying is therefore also referred to as 'adapting' or 'fitting'. The adaptation technique may optimize an energy function based on an external energy term which adapts the model to the image data and an internal energy term which maintains a rigidness of the model.

Models of the above described type, as well as other types, are known per se, as are adaptation techniques for the applying of such models to a medical image.

For example, a publication titled "*Automatic Model-based Segmentation of the Heart in CT Images*" by O. Ecabert et al., IEEE Transactions on Medical Imaging 2008, 27(9), pp. 1189-1201, describes a model-based approach for the automatic segmentation of the heart from three-dimensional (3D) Computed Tomography (CT) images.

It may occur that a medical image shows only part of an anatomical structure of the patient. A reason for this may be that the imaging modality used in acquiring the medical image may only provide a limited field of view of the patient's interior. Other reasons for the medical image showing only part of the anatomical structure may be that other parts may be occluded, may not be visible in the used imaging modality, etc.

SUMMARY OF THE INVENTION

It would be advantageous to have a system or method for adapting a model to a medical image which shows only part of an anatomical structure of the patient. It would further be advantageous to facilitate a further processing of the adapted model.

A first aspect of the invention provides a system for model-based segmentation, the system comprising:

an image interface for accessing image data representing a medical image of a patient, the medical image showing a first part of an anatomical structure of the patient while not showing a second part of the anatomical structure;

a data storage comprising model data defining a model for segmenting the type of anatomical structure; and a segmentation subsystem for performing a model-based segmentation of the medical image by applying the model to the image data of the medical image, the model-based segmentation providing an adapted model having:

i) a first model part having been adapted to the first part of the anatomical structure in the medical image of the patient, and ii) a second model part representing the second part of the anatomical structure not having been adapted to a corresponding part of the medical image;

the segmentation subsystem being configured for generating metadata identifying the first model part to enable the first model part to be distinguished from the second model part in a further processing of the adapted model.

A further aspect of the invention provides a workstation or imaging apparatus comprising the system.

A further aspect of the invention provides a method for model-based segmentation, the method comprising:

accessing image data representing a medical image of a patient, the medical image showing a first part of an anatomical structure of the patient while not showing a second part of the anatomical structure;

providing model data defining a model for segmenting the type of anatomical structure performing a model-based segmentation of the medical image by applying the model to the image data of the medical image, the model-based segmentation providing an adapted model having:

i) a first model part having been adapted to the first part of the anatomical structure in the medical image of the patient, and ii) a second model part representing the second part of the anatomical structure not having been adapted to a corresponding part of the medical image;

generating metadata identifying the first model part to enable the first model part to be distinguished from the second model part in a further processing of the adapted model.

A further aspect of the invention provides a computer program product comprising instructions for causing a processor system to perform the method.

The above measures involve obtaining a medical image of a patient. The medical image of the patient may be obtained using various imaging modalities such as, e.g., Ultrasound, CT, Magnetic Resonance (MR) imaging, etc. Furthermore, model data is provided which defines a model for segmenting a type of anatomical structure as shown in the medical image. The anatomical structure may be, e.g., an organ, an organ system, a particular part of an organ, etc. As such, the model may be arranged for segmenting a human heart, a human brain, etc. The model may initially be a non-patient specific model. The model data may be comprised on a data storage such as semiconductor memory, a magnetic or optical disk, etc. Furthermore, a segmentation subsystem is provided for performing a model-based segmentation of the medical image, namely by applying the model to image data of the medical image. For that purpose, the segmentation subsystem may use an adaptation technique. Such an adaptation technique may be represented by, e.g., data defining a plurality of operations. It is noted that the functionality described in this paragraph is known per se from the field of model-based segmentation of anatomical structures.

The medical image accessed by the system shows a first part of the anatomical structure of the patient, but does not show a second part of the anatomical structure. There may be various reasons for the medical image only showing part of the anatomical structure. For example, in trans-esophageal echocardiography (TEE), often only small parts of the heart are imaged. Accordingly, when applying the model to the image data of the medical image, the segmentation subsystem may locally adapt a first model part of the model to the image data of the medical image of the patient, namely based on the image data showing a first part of the anatomical structure. However, due to the medical image not showing a second part of the anatomical structure, a second model part of the model may not be locally adapted to corresponding image data in the medical image, i.e., due to such image data being absent in the medical image. Accordingly, a model may be obtained which is partly personalized, i.e., locally adapted to the medical image of the patient, and partly not personalized. In this respect, it is noted that the second part is not locally adapted but may still be, in general terms, adapted to the medical image, namely based on the first part having been adapted to the image data, thereby causing or imposing changes in the second part of the model.

The segmentation subsystem is configured for generating metadata identifying the first (personalized) model part to enable the adapted model part to be distinguished from the second (non-personalized) model part in a further processing of the adapted model. For example, in case of a mesh model, the metadata may identify vertices and/or edges which belong to the personalized model part. Another example is that the mesh model itself may comprise, for each vertex and/or edge, state information identifying whether the vertex and/or edge belongs to the personalized or to the non-personalized part of the model.

The inventors have recognized that in case a medical image only shows part of an anatomical structure, a model which is applied to the medical image may only be in part personalized. Accordingly, the adapted model may be misleading in that it may, in part, still represent a non-locally personalized and thereby largely average, non-patient specific model. Whether a part of the model is or is not personalized may affect the further processing of the adapted model. For example, the segmentation subsystem may, when having access to a further medical image of the patient, refrain from adapting the already-personalized model part, and instead use the further medical image to personalize only the non-personalized model part. Another example is that when visualizing the adapted model, it may be desirable to visually indicate to the user which part of the model has been personalized and which part of the model has not been personalized. It will be appreciated that other advantageous uses of the generated metadata exist as well, and that such metadata may take various suitable forms.

Optionally, the system further comprises a display processor for generating an output image providing a rendering of the adapted model, the display processor being configured for selecting different rendering techniques based on the metadata for rendering the first model part differently from the second model part in the output image. The display processor thus visualizes the adapted model in the output image and uses different rendering techniques for visualizing the personalized part and the non-personalized part of the adapted model based on the metadata. Examples of different rendering techniques include, but are not limited to: use of different colors, different transparency or shading of triangle faces, etc. For example, the non-personalized part of the adapted model may be rendered only as an outline or wireframe having transparent triangle faces, whereas the personalized part of the adapted model may be rendered having solid or nearly solid triangle faces. This aspect of the invention is based on the insight that even if part of the adapted model is not personalized, it may still be useful to render the complete model in order to provide anatomical context for the user. However, a normal visualization may imply that the entire model is personalized, which may be misleading. By rendering the non-personalized part of the adapted model differently from the personalized part of the adapted model, this information is visually conveyed to the user.

Optionally, the display processor is configured for rendering the adapted model as an overlay over an underlying medical image, the underlying medical image being the medical image or another medical image of the patient. By rendering the adapted model over the medical image to which it was adapted, or over another medical image of the patient, the user can match the anatomical information represented by the adapted model to the underlying medical image. It is noted that the other medical image may also show the anatomical structure, but acquired using a different imaging modality, at a different time, etc. Moreover, adapted model may be registered with the medical image in the output image so as to at least coarsely match the adapted model to the underlying medical image.

Optionally, the model is fitted is to an ultrasound image of the patient, and the display processor is configured for rendering the adapted model as an overlay over an X-ray image of the patient. The output image thus shows an adapted model having been partially personalized using an ultrasound image, being overlaid over an X-ray image of the patient.

Optionally, the medical image provides a limited field of view of the patient's interior, and the display processor is configured for distinguishing in the output image between a model part of the model representing anatomy inside the limited field of view of the medical image and another model part of the model representing anatomy outside of the limited field of view. A medical image may provide a relatively narrow field of view. For example, an ultrasound image typically provides a narrower field of view than an X-ray image. Accordingly, the medical image may only partially show the anatomical structure. By distinguishing in the output image between a model part of the model representing anatomy inside the limited field of view of the medical image and another model part of the model representing anatomy outside of the limited field of view, the user is provided with an indication of the field of view of the medical image, e.g., while viewing the model overlaid over an X-ray image rather than overlaid over the ultrasound image. It is noted that, for said distinguishing, different rendering techniques may be used, including, but not limited to: use of different colors, different transparency or shading of the triangle faces, etc.

Optionally, the segmentation subsystem is configured for, after applying the model to the image data of the medical image, applying the adapted model to the image data of a second medical image, thereby further adapting the adapted model, the second medical image showing at least the second part of the anatomical structure, the second model part of the adapted model having been adapted to the second part of the anatomical structure in the second medical image. The adapted model may thus comprise a first model part personalized from a first medical image, a second model part personalized from a second medical image, etc. Additionally, there may also be one or more non-personalized model parts. Advantageously, the display processor may distinguish in the output image between the different model parts by using different rendering techniques, thereby indicating to the user whether a respective model part was personalized or not, and in the former case, whether it was personalized to the currently displayed medical image or to another medical image of the patient.

Optionally, the segmentation subsystem is configured for assigning a state to respective model parts of the model, the display processor is configured for selecting between different rendering techniques based on said assigned state when rendering a respective model part in the output image, and the segmentation subsystem is configured for assigning the state to the respective model part based on at least one of:

whether or not the respective model part has been adapted to the underlying medical image, whether or not the respective model part represents anatomy which is shown in the underlying medical image, and whether or not the respective model part has been adapted to another medical image of the patient than the underlying medical image.

Optionally, the first model part represents an anatomical part of the anatomical structure which is shown only partially in the medical image, and the segmentation subsystem is configured for:

estimating a local transformation for adapting the first model part to the medical image; and in estimating the local transformation, applying a regularization term accounting for the anatomical part being only partially shown in the medical image.

This aspect of the invention is based on the insight that if an anatomical part is only shown partially in the medical image, and in particular if only a small part is shown, the transformation may be underdetermined or mis-determined. This may lead to unrealistic and/or distorted transformations which may corrupt the segmentation result. By applying a regularization term to the transformation estimation which accounts for the anatomical part being only partially shown in the medical image, the transformation estimation is stabilized.

Optionally, the regularization term provides a stronger regularization when less of the anatomical part is shown in the medical image. Hence, the transformation estimation is more stabilized when a smaller part of the anatomical part is shown.

Optionally, the regularization term provides a Tikhonov regularization

Optionally, the segmentation subsystem is configured for adapting the model to the second part of the anatomical structure by, after or during the first model part being adapted to the first part of the anatomical structure in the medical image of the patient, extrapolating a shape of the first model part to the second model part of the model.

Optionally, performing the extrapolation comprises minimizing an internal energy term defined on the basis of a relationship existing between vertices and/or edges of the first model part and the second model part.

In accordance with the above, a system and method may be provided for performing a model-based segmentation of a medical image which only partially shows an anatomical structure. In accordance therewith, a model may be applied to the image data of the medical image, the model-based segmentation providing an adapted model having a first model part having been adapted to the first part of the anatomical structure in the medical image of the patient, and a second model part representing the second part of the anatomical structure not having been adapted to a corresponding part of the medical image. Metadata may be generated which identifies the first model part to enable the first model part to be distinguished from the second model part in a further processing of the adapted model. Advantageously, the metadata may be used to generate an output image which visually indicates to the user which part of the model has been personalized and which part of the model has not been personalized. Other advantageous uses of the metadata in the further processing of the adapted model have also been conceived.

It will be appreciated by those skilled in the art that two or more of the above-mentioned embodiments, implementations, and/or aspects of the invention may be combined in any way deemed useful.

Modifications and variations of the imaging apparatus, the workstation, the method, and/or the computer program product, which correspond to the described modifications and variations of the system, can be carried out by a person skilled in the art on the basis of the present description.

A person skilled in the art will appreciate that the method may be applied to multi-dimensional image data, e.g. to two-dimensional (2D), three-dimensional (3D) or four-dimensional (4D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

The invention is defined in the independent claims. Advantageous embodiments are defined in the dependent claims.

BRIEF DESCRIPTION OF THE DRAWINGS

These and other aspects of the invention are apparent from and will be elucidated with reference to the embodiments described hereinafter. In the drawings.

Figure 1:
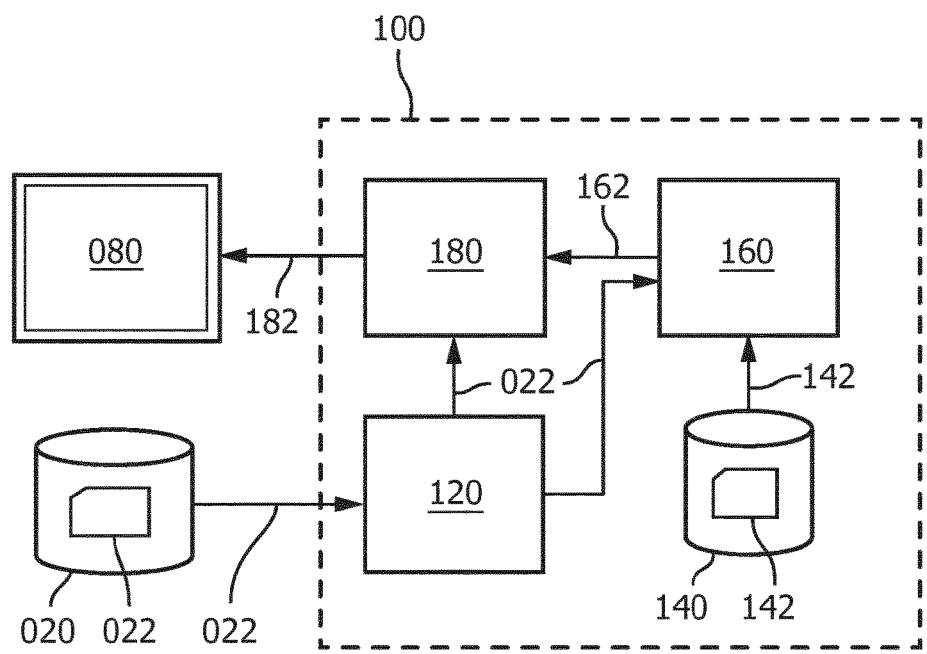
FIG. 1 shows a block diagram of a system for model-based segmentation.

It should be noted that items which have the same reference numbers in different Figures, have the same structural features and the same functions, or are the same signals. Where the function and/or structure of such an item has been explained, there is no necessity for repeated explanation thereof in the detailed description.

LIST OF REFERENCE NUMBERS

The following list of reference numbers is provided for facilitating the interpretation of the drawings and shall not be construed as limiting the claims.
020 image repository
022-026 data representing medical image
030 field of view
080 display
100 system for performing model-based segmentation
120 image interface
140 data storage
142 model data
160 segmentation subsystem
162 output data of segmentation subsystem
180 display processor
182 data representing output image
200 method for model-based segmentation
210 accessing image data
220 providing model data
230 performing model-based segmentation
240 generating metadata
250 computer readable medium
260 instructions
400-403 adapted model
410 model part adapted to medical image
420 model part not adapted to medical image
500 system matrix U
510-514 human heart
520-524 compartment of human heart

DETAILED DESCRIPTION OF EMBODIMENTS

FIG. 1 shows a system 100 for model-based segmentation. The system 100 comprises an image interface 120 for accessing image data 022 representing a medical image of a patient. In the example of FIG. 1, the image interface 120 is shown to be connected to an external image repository 020. For example, the image repository 020 may be constituted or be part of a Picture Archiving and Communication System (PACS) of a Hospital Information System (HIS) to which the system 100 may be connected or comprised in. Accordingly, the system 100 may obtain access to the medical image 022. In general, the image interface 120 may take various forms, such as a network interface to a local or wide area network, such as the Internet, a storage interface to an internal or external data storage, etc.

It is noted that throughout this text and where appropriate, a reference to the medical image is to be understood as a reference to the medical image's image data.

The system 100 further comprises a data storage 140 comprising model data 142 defining a model for segmenting a type of anatomical structure as shown in the medical image 022. For example, the model data 142 may define the model as a mesh of triangles. The data storage 140 is shown to be an internal component of the system 100, and may be constituted by, e.g., a disk-based data storage such as a hard disk, a semiconductor-based data storage such as a ROM or RAM memory, a removable storage medium inserted into a storage medium reader, etc. It is noted that the data storage 140 may also be separately provided, e.g., in the form of a removable storage medium comprising the model data 142.

The system 100 further comprises a segmentation subsystem 160 for performing a model-based segmentation of the medical image by applying the model to the image data of the medical image. For that purpose, the segmentation subsystem 160 is shown to receive the image data 022 from the image interface 120, and the model data 142 from the data storage 140. In accordance with the invention as claimed, the medical image may show a first part of an anatomical structure of the patient while not showing a second part of the anatomical structure. The segmentation subsystem 160 is configured for providing an adapted model having i) a first model part having been adapted to the first part of the anatomical structure in the medical image of the patient, and ii) a second model part representing the second part of the anatomical structure not having been adapted to a corresponding part of the medical image. The segmentation subsystem 160 is further configured for generating output data 162 comprising metadata identifying the first model part of the model to allow the first model part to be distinguished from the second model part in a further processing of the adapted model.

FIG. 1 further shows an optional aspect of the system 100, in that the system 100 may comprise a display processor 180 configured for generating an output image 182 providing a rendering of the adapted model. FIG. 1 shows the display processor 180 providing the output image 182 to a display 080. Alternatively, the output image 182 may be stored, e.g., on the image repository 020 via the image interface 120, may be provided to another entity, e.g., for further analysis, etc. The display processor 180 may be configured for distinguishing between the first model part and the second model part in the output image 182 by using different rendering techniques. For that purpose, the display processor 180 may use the adapted model and the metadata, as may be obtained from the output data 162 of the segmentation subsystem 160. For example, in case of a mesh model, the metadata may identify vertices and/or edges which belong to the first, i.e., personalized, model part. Another example is that the mesh model itself may comprise, for each vertex and/or edge, state information identifying whether the vertex and/or edge belongs to the personalized or to the non-personalized part of the model. Examples of different rendering techniques include, but are not limited to: use of different colors, different transparency of triangle faces, etc.

Another optional aspect shown in FIG. 1 is that the display processor 180 may render the adapted model as an overlay over the medical image. For that purpose, the display processor 180 may internally receive the image data 122 of the medical image from the image interface 120. Alternatively, another medical image of the patient may be used as an underlying medical image for the overlay of the adapted model in the output image.

It is noted that various operations of the system 100, including various optional aspects thereof, will be explained in more detail with reference to FIGS. 4-9.

The system 100 may be embodied as, or in, a single device or apparatus, such as a workstation or imaging apparatus. The device or apparatus may comprise one or more microprocessors which execute appropriate software. The software may have been downloaded and/or stored in a corresponding memory, e.g., a volatile memory such as RAM or a non-volatile memory such as Flash. Alternatively, the functional units of the system may be implemented in the device or apparatus in the form of programmable logic, e.g., as a Field-Programmable Gate Array (FPGA). In general, each functional unit of the system may be implemented in the form of a circuit. It is noted that the system 100 may also be implemented in a distributed manner, e.g., involving different devices or apparatuses. For example, the distribution may be in accordance with a client-server model.

Figure 2:
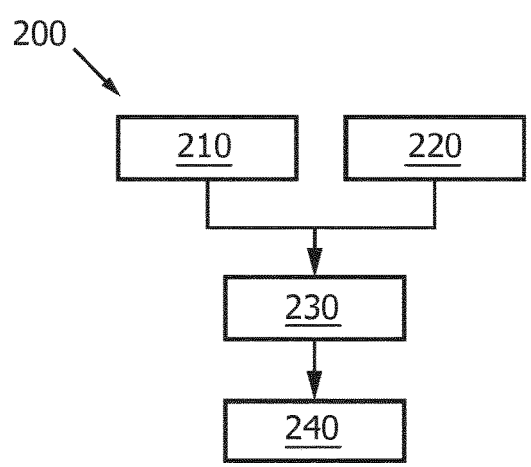
FIG. 2 shows a flow chart of a method for model-based segmentation.

FIG. 2 shows a method 200 for performing model-based segmentation. The method 200 may correspond to an operation of the system 100 of FIG. 1. However, this is not a limitation, in that the method 200 may also be performed using one or more different devices or apparatuses. The method 200 comprises, in an operation titled "ACCESSING IMAGE DATA", accessing 210 image data representing a medical image of a patient, the medical image showing a first part of an anatomical structure of the patient while not showing a second part of the anatomical structure. The method 200 further comprises, in an operation titled "PROVIDING MODEL DATA", providing 220 model data defining a model for segmenting the type of anatomical structure. The method 200 further comprises, in an operation titled "PERFORMING MODEL-BASED SEGMENTATION", performing 230 a model-based segmentation of the medical image by applying the model to the image data of the medical image, the model-based segmentation providing an adapted model having i) a first model part having been adapted to the first part of the anatomical structure in the medical image of the patient, and ii) a second model part representing the second part of the anatomical structure not having been adapted to a corresponding part of the medical image. The method 200 further comprises, in an operation titled "GENERATING METADATA", generating 240 metadata identifying the first model part to enable the first model part to be distinguished from the second model part in a further processing of the adapted model.

It will be appreciated that the above operation may be performed in any suitable order, e.g., consecutively, simultaneously, or a combination thereof, subject to, where applicable, a particular order being necessitated, e.g., by input/output relations.

Figure 3:
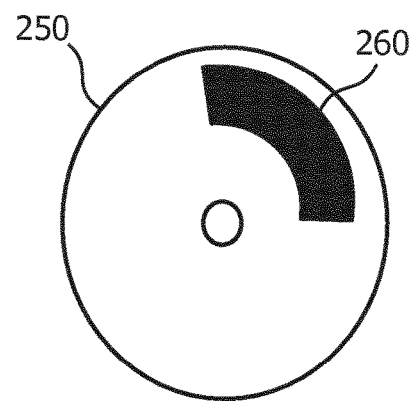
FIG. 3 shows a computer program product for carrying out the method.

The method 200 may be implemented on a computer as a computer implemented method, as dedicated hardware, or as a combination of both. As also illustrated in FIG. 3, instructions for the computer, e.g., executable code, may be stored on a computer readable medium 250, e.g., in the form of a series 260 of machine readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 3 shows an optical disc 250.

The operation of the system of FIG. 1 and the method of FIG. 2, including various optional aspects thereof, may be explained in more detail as follows. It is noted that the examples may refer to the model being mesh model, the anatomical structure being a human heart, and the metadata of the segmentation subsystem being used for generating a visualization of the adapted model. However, these aspects are not limitations of the invention as claimed but rather serve for providing a context to the explanation.

Model-based segmentation may be used to automatically detect organ boundaries in medical images. As described in the publication "*Automatic Model-based Segmentation of the Heart in CT Images*", as introduced in the background section, model-based segmentation was originally performed on images that comprised the complete organ to segment, e.g., the heart, and some surrounding regions. However, model-based segmentation may also be applied to images that only show part of, and sometimes a small part of, the organ or other anatomical structure. For example, in ultrasound images, especially those acquired during trans-esophageal echocardiography (TEE), typically only small parts of the heart are imaged. It may be desirable to, after segmentation, display the heart model as a 2D or 3D overlay over the ultrasound image. However, with ultrasound image's field of view (FOV) of the patient's interior being smaller than the heart and thus only showing the heart partially, the heart model may extend over the ultrasound image's boundaries. Since outside the image's FOV no image information may be available, the shape of the model may here be given mainly by the mean shape of the model, e.g., its non-personalized reference shape. Nevertheless, despite not being personalized, it may still be useful to show the complete model in order to provide context for the user. However, a normal visualization may imply that parts of the model representing anatomy outside the FOV region are also personalized, which may be misleading. This may be particularly relevant when the model from a TEE segmentation is overlaid over another medical image, such as an X-ray image, as it can no longer be seen directly which model parts were contained in the original image's FOV.

Figure 4:
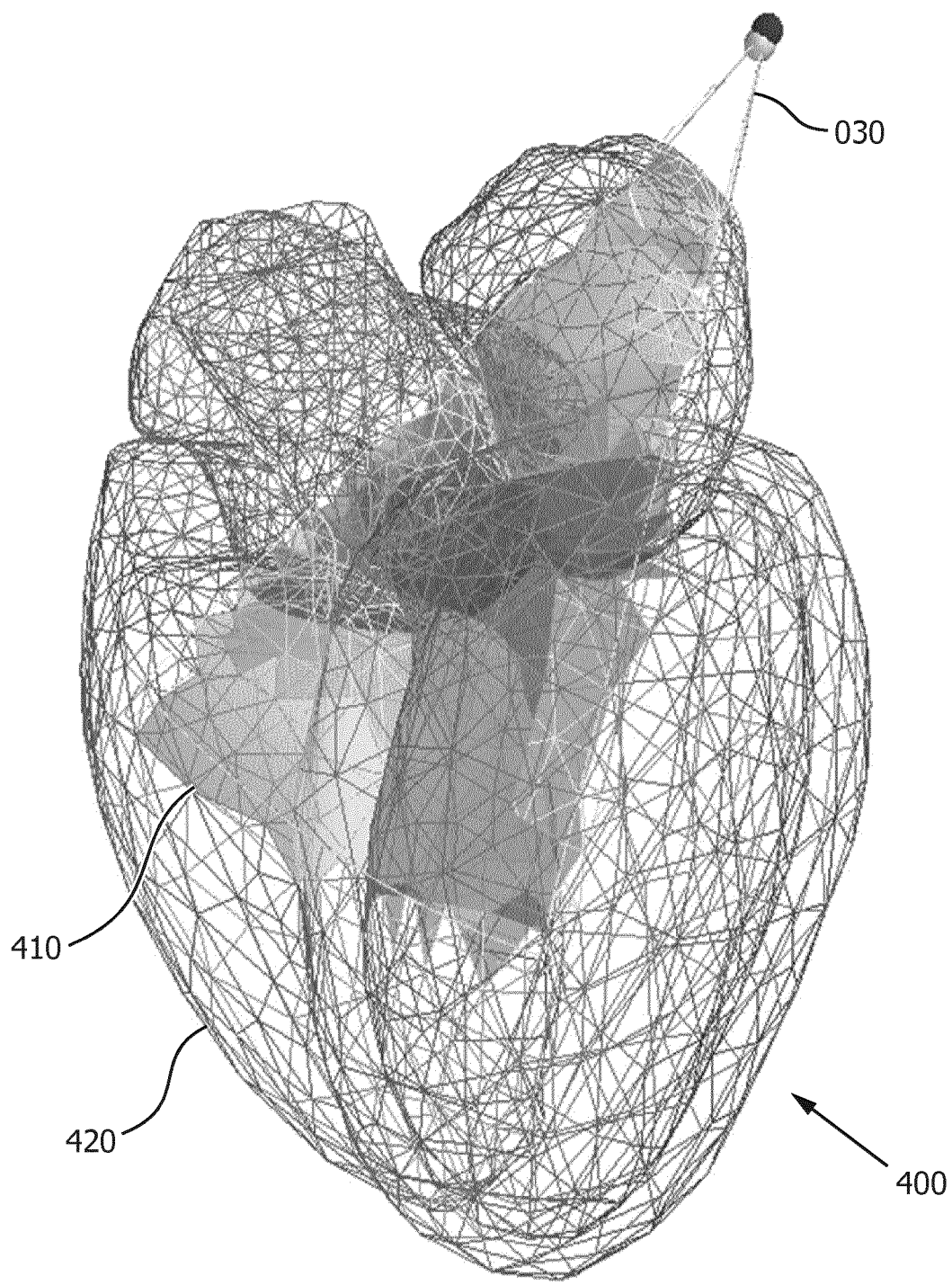
FIG. 4 shows an example of an output image generated by a display processor of the system, in which a model is differently visualized depending on whether or not the model represents anatomy inside a field of view of an ultrasound image.

FIG. 4 shows an example of an output image as may be generated by the system, which addresses the above. Namely, in the output image, a model 400 is differently visualized depending on whether or not the model represents anatomy inside a FOV of an ultrasound image. It is noted that the model representing anatomy inside the FOV of a medical image is also referred to the model being 'inside the FOV', and conversely, 'outside the FOV'. With further reference to FIG. 4; here, a part 410 of the model within the FOV 030 of the ultrasound image is shown with solid colored triangles, and the remaining part 420 outside the FOV 030 is shown as a 'wireframe' by only its edges being rendered. It is noted that such different visualizations may also be applied to 2D model visualizations generated by the system. For example, parts of the model inside the FOV may be filled with color, and parts of the model outside the FOV may only be shown as an outer contour.

It is noted that in many cases, the part of the model which is locally adapted, i.e., personalized, corresponds to the part of the model which represent anatomy inside the FOV of the medical image. However, this may not need to be the case. For example, a smaller part of the model may be personalized than is shown in the medical image. Another example is that the personalization may have been performed with respect to another medical image of the patient having a different FOV. Concrete examples may be the following:

The model may be personalized using a medical image providing a first FOV. Subsequently, a second medical image may be received providing a second FOV. For example, both medical image may be obtained during TEE while the TEE probe is changed in position. The model may have not been adapted yet to the second FOV (e.g., for speed reasons during live tracking). However, the position of the second FOV may be known with respect to the first FOV, e.g., from tracking the TEE probe in an X-ray image. Thus, the personalized model part may be completely or partially located outside the second FOV.

The model may be personalized in a first FOV and the personalization may have been extended to another part of the model using a second FOV. Accordingly, the overall personalized part of the model may be larger than the second FOV.

The model may have been entirely personalized using a CT image, but may be visualized as an overlay over an ultrasound image. Thus, the personalized region may cover the entire anatomical structure, but the FOV corresponding to the underlying ultrasound image may correspond to only a small part of the model.

Accordingly, if the personalized region does not coincide with the FOV, different visualizations may be used for the personalized and the FOV region. For example, the segmentation subsystem may be configured for assigning a state to each model part of the model, and the display processor may be configured for selecting between different rendering techniques based on said assigned state when rendering a respective model part in the output image. The segmentation subsystem may then assign the state to the respective model part based on whether or not the respective model part has been adapted to the underlying medical image, and/or whether or not the respective model part represents anatomy which is shown in the underlying medical image, and/or whether or not the respective model part has been adapted to another medical image of the patient than the underlying medical image. In case the underlying medical image is part of an image sequence, the state may also indicate to which medical image the respective model part has been adapted. This may allow adding timing information to a visualization of the model in an output image. For example, if a model part was personalized in a previous heart cycle, the visualization may indicate how "old" the personalization is, e.g., by desaturating the colors of the respective model part towards gray. Another example is that if the heart phase of the current image is known, the visualization may indicate how close the heart phase of the medical image is to the current heart phase from which a respective model part was personalized.

It may be determined as follows whether a model part represents anatomy within the FOV of a particular image. Here, it is assumed that the model consists of points and triangles defined as coordinates in a particular coordinate system. After adaptation, the location of the different points and triangles with respect to the medical image may therefore be known. Moreover, the location of the FOV of the medical image may be determined in the same coordinate system. Namely, the location may be known beforehand (e.g., from the imaging system), or may be determined afterwards (e.g. by applying image processing methods, such as thresholding in 3D or 4D). Having the point/triangle locations and FOV location in a common image coordinate system, it may be determined for each point/triangle of the model if it is inside or outside the FOV region. The outside region of the model may then be visualized more subtly (e.g. semi-transparently, or only showing triangle faces without solid faces), whereas the inside region may be visualized more prominently (e.g. with solid faces and in different colors). Alternatively, the complete mesh (inside+outside region) may be visualized having a similar opacity, and the parts inside the FOV may be overlaid again using a more prominent visualization (e.g., color) to render them more distinctive.

Figure 5:
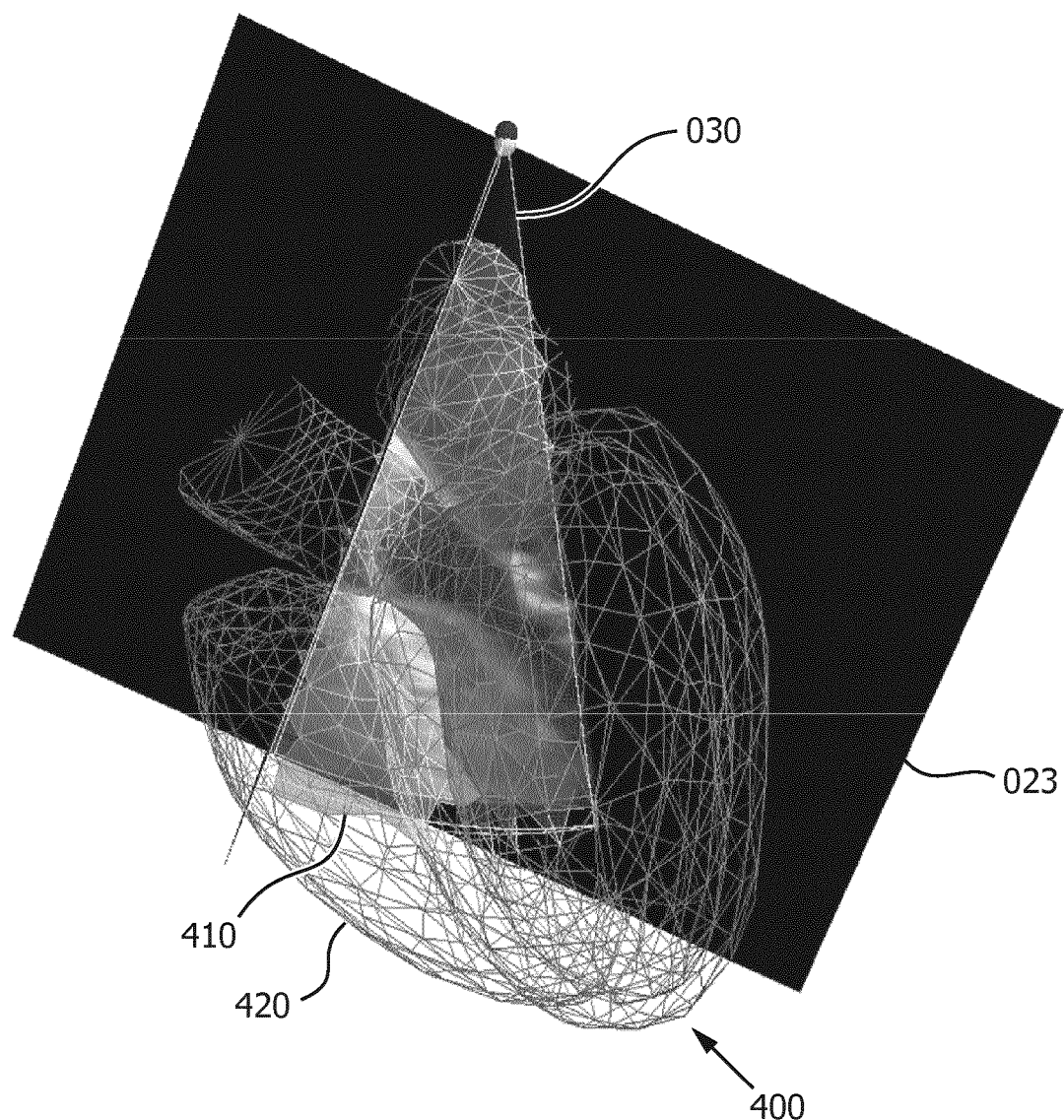
FIG. 5 shows a further example of an output image generated by the display processor of the system, in which the model is overlaid over the ultrasound image.

FIG. 5 shows a further example of an output image generated by the display processor of the system, in which the model is overlaid over a medical image, namely an ultrasound image. Various other visualization scenarios are equally conceivable. For example, the model may be fitted to an ultrasound image of the patient, and the display processor may render the adapted model as an overlay over an X-ray image of the patient.

FIGS. 6-9 relate to the following. A typical adaptation of the model, as performed by the segmentation subsystem, may involve firstly modifying the mean shape of the model using a global rigid/affine transformation to improve the model-to-image alignment. This transformation may be estimated from all model parts that are visible within the FOV. Second, in case of multi-compartmental model such as a heart model, multiple local rigid/affine transformations may be estimated for different compartments of the heart model (e.g. left/right ventricle, left/right atrium) to further improve the alignment between model and medical image. However, if a compartment is only partially visible within the FOV, the transformation parameters of that compartment may be estimated only from those model points that can detect a corresponding image point within the FOV. Consequently, the transformation might be underdetermined, and also be mis-determined in case wrong image points are being detected (e.g., due to noise in the medical image). This may lead to unrealistic and distorted transformations that corrupt the segmentation result.

To address the above, the system may apply a regularization term to the transformation estimation. The regularization may be determined such that, where a large region of the compartment is within the FOV, regularization has negligible effect on this well-defined problem. However, where a large region is outside the FOV, regularization may stabilize the transformation estimation by suppressing unrealistic deviations from the mean model shape. Additionally, for regions outside the FOV, the shape may extrapolated from the regions inside the FOV using a shape-constraining mechanism of the segmentation model.

With further reference to the example of the model being a heart model: once the heart model is roughly localized in the medical image, the heart model may be adapted to the medical image in several steps. Firstly, a global rigid/affine transformation may be estimated for all model points to provide for model-to-image alignment based on translation, rotation, scaling, and shearing. Second, multiple local rigid/affine transformations may be estimated, one for each compartment, such as left/right ventricle and left/right atrium. These transformations may be estimated because in some patients or heart phases, the relative size or orientation of different compartments may vary. By estimating different transformations per compartment, these variations may be compensated and a more accurate segmentation may be obtained.

The transformation parameters may be estimated as follows. For each triangle i of the model mesh, a target point $x_i$ may be detected in the image, e.g., using trained image features (such as large image gradients close to the mesh surface). A simplified version of an external energy equation that attracts the triangle centers $c_i(q)$ (being a function of the transformation parameters q to be estimated) to the image points $x_i$ may be described as:

$$E_{ext} = \sum_{i=1}^{T} [c_i(q) - x_i]^2 \qquad \text{Eq. (1)}$$

Figure 6:
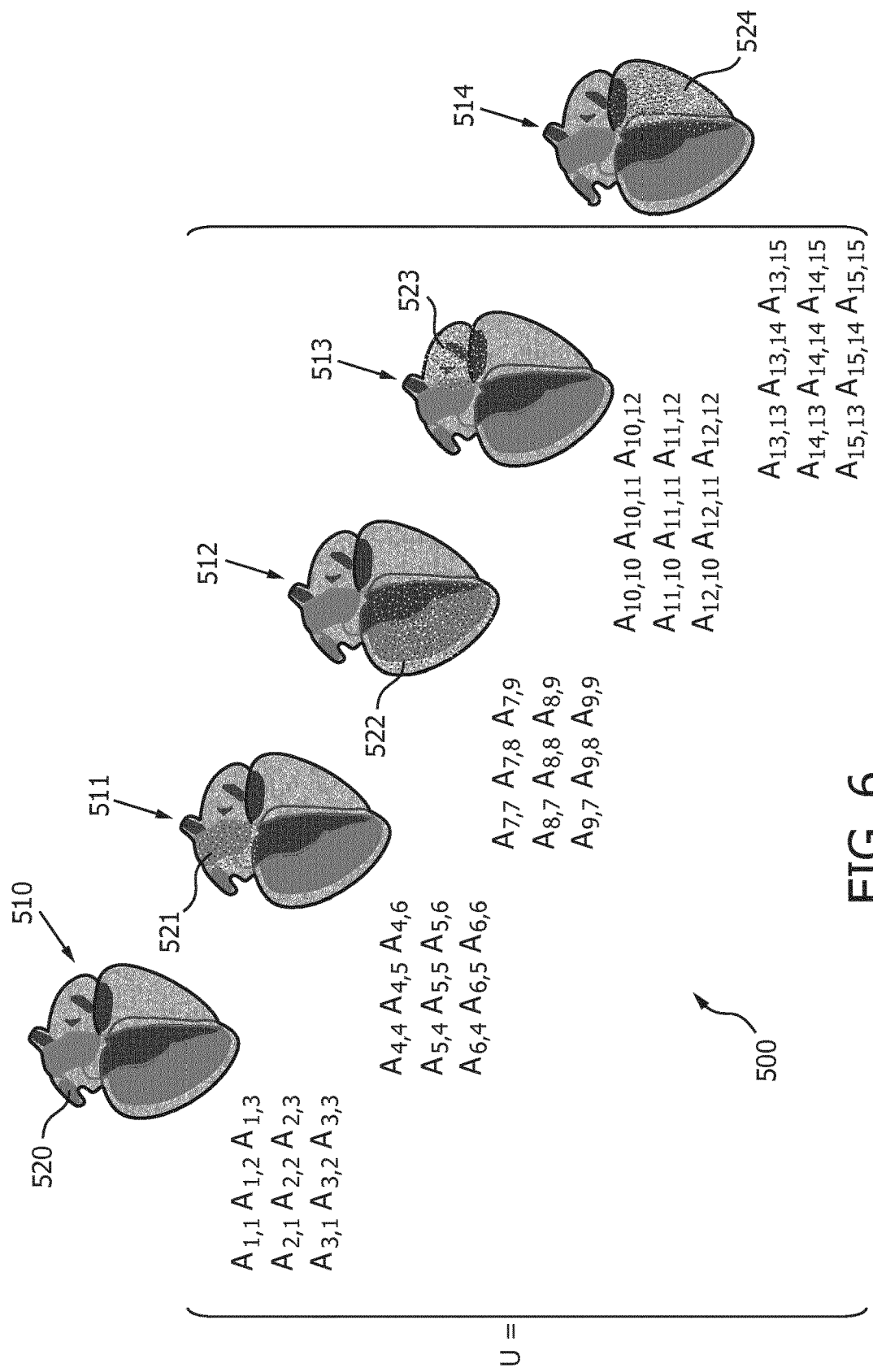
FIG. 6 illustrates use of a regularization term in estimating a local transformation for adapting the first model part to the medical image.

Equation (1) may be minimized to compute optimal transformation parameters q and hence to optimally align $c_i$ with $x_i$. A singular value decomposition (SVD) may be employed to minimize equation (1). During optimization, a single system matrix U may be inverted. As can be seen in FIG. 6, the diagonal of the matrix U may be composed of multiple sub-matrices, each representing one of the organ compartments 520-524, which are graphically indicated in FIG. 6 in respective heart models 510-514. When inverting the matrix U, a sufficient number of target points is expected for each of those compartments. In case of a limited FOV, most of the mesh triangles of a specific compartment might not detect any target points as they may be missing an image information. In an extreme case, a complete component corresponding to one transformation might be outside of the FOV. This may lead to an ill-conditioned equation system with the matrix U showing exclusively zero entries for this component, thereby making a straightforward matrix inversion unreliable.

To stabilize this matrix inversion, a regularization may be employed, such as a Tikhonov regularizer. The condition number of matrix U may be increased by adding a small value λ to the diagonal of U. Considering the singular values of the complete system matrix U, a value of $\lambda = 0.01\sigma_{max}$ may be suitable, where $\sigma_{max}$ is the maximum singular value of U (commonly derived from a well-conditioned sub-matrix, such as the left ventricle).

Figure 7:
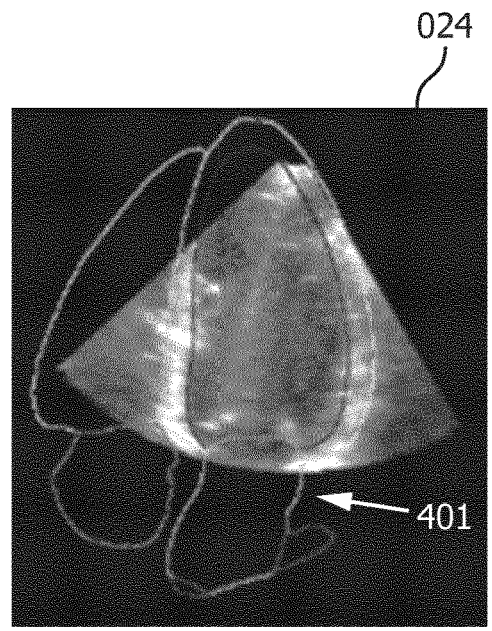
FIG. 7 shows a segmentation result after global rigid/affine transformation.
Figure 8:
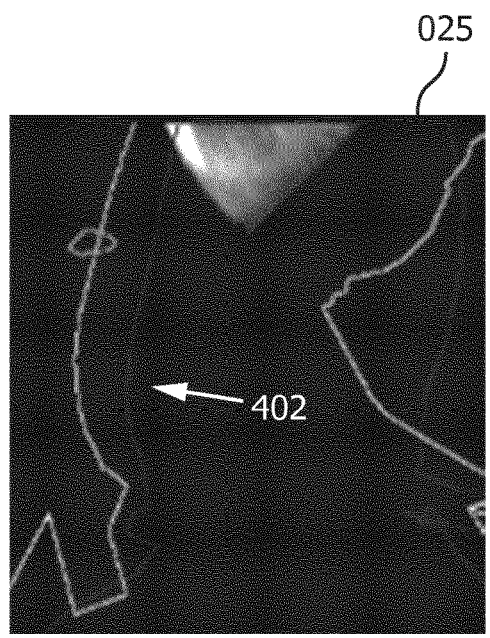
FIG. 8 shows a segmentation result after local rigid/affine transformation without using the regularization term in estimating the transformation.
Figure 9:
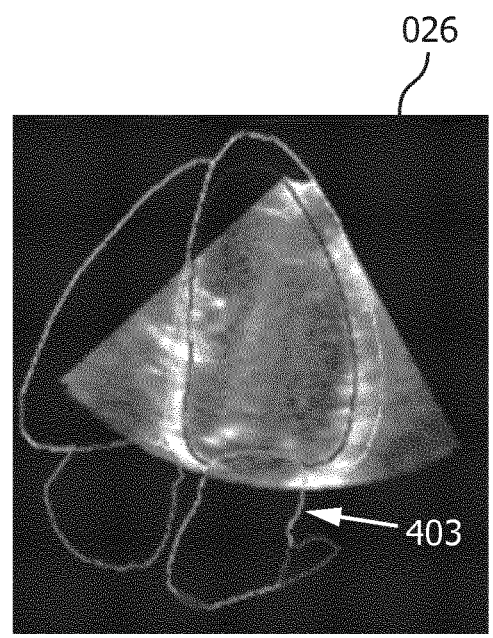
FIG. 9 shows a segmentation result after local rigid/affine transformation with using regularization in estimating the transformation.

FIGS. 7-9 illustrate the effect of the applied regularizer. FIG. 7 shows the segmentation result after global rigid/affine transformation in the form of an overlay of the thus-far adapted model 401. As can be observed, heart components such as the left and right atrium as well as the outer boundaries of the right ventricle are extending outside of the FOV. Since little image information is available at the surface of these components, the corresponding sub-matrices of these components in U comprise values close to zero. A straightforward inversion of the ill-conditioned matrix U using SVD thus leads to unrealistic heart shape deformations during local rigid/affine transformation, if no regularization is applied. This is shown in FIG. 8 in the form of an overlay of the thus-adapted model 402. As shown by the adapted model 403 in FIG. 9, the applied Tikhonov regularizer stabilizes these sub-matrices by forcing unity matrices with value λ on the diagonal, and the inversion of the regularized matrix U keeps the transformation parameters of those compartments unchanged.

It will be appreciated that for regions outside the FOV, the shape of the model may be extrapolated from the parts of the model inside the FOV using a shape-constraining mechanism of the model. Namely, the model may be extrapolated by minimizing an internal energy term, which may correspond to (in a simplified version):

$$E_{int} = \Sigma(v_i - v_j - (T[m_i] - T[m_j]))^2 \qquad \text{Eq. (2)}$$

Here, $v_i$ denotes a mesh vertex and $v_j$ one of its neighbors. Any deviation from the difference between the corresponding vertices $m_i$ and $m_j$ in the mean mesh under a global transformation T may contribute to the internal energy. Because no target image points $x_i$ are found outside the FOV, the external energy does not contribute there (see Eq. (1)). Thus, minimizing the internal energy may keep the shape outside the FOV as similar to the mean shape as possible under boundary conditions set by the adapted shape inside the FOV.

It will be appreciated that the invention also applies to dynamic models which may be advantageously fitted to deforming structures such as the heart.

It will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for model-based segmentation, the system comprising:
   an image interface for accessing image data representing a medical image of a patient, the medical image showing a first part of an anatomical structure of the patient within a field of view of the medical image while not showing a second part of the anatomical structure outside the field of view of the medical image;
   a data storage comprising model data defining a model for segmenting a type of the anatomical structure; and
   a segmentation subsystem for performing a model-based segmentation of the medical image by applying the model to the image data of the medical image, the model-based segmentation providing an adapted model having:
   i) a first model part, specific to the patient, corresponding to the first part of the anatomical structure in the medical image of the patient, and
   ii) a second model part representing the second part of the anatomical structure not having been adapted to a corresponding part of the medical image;
   the segmentation subsystem being configured for generating metadata identifying the first model part to enable the first model part to be distinguished from the second model part in a further processing of the adapted model.

2. The system according to claim 1, wherein the system further comprises a display processor for generating an output image providing a rendering of the adapted model, wherein the display processor is configured for selecting different rendering techniques based on the metadata for rendering the first model part differently from the second model part in the output image.

3. The system according to claim 2, wherein the display processor is configured for rendering the adapted model as an overlay over an underlying medical image, the underlying medical image being the medical image or another medical image of the patient.

4. The system according to claim 3, wherein the model is fitted to an ultrasound image of the patient, and wherein the display processor is configured for rendering the adapted model as an overlay over an X-ray image of the patient.

5. The system according to claim 3, wherein the segmentation subsystem is further configured for assigning states to first and second model parts, respectively, wherein the display processor is further configured for selecting between different rendering techniques based on said assigned states when rendering the first and second model parts in the output image.

6. The system according to claim 5, wherein the segmentation subsystem is further configured for assigning the state to the respective model part based on at least one of:
   whether or not the respective model part has been adapted to the underlying medical image,
   whether or not the respective model part represents anatomy that is shown in the underlying medical image, and
   whether or not the respective model part has been adapted to another medical image of the patient other than the underlying medical image.

7. The system according to claim 2, wherein the display processor is configured for distinguishing in the output image between the model part of the adapted model representing anatomy inside the field of view of the medical image and the second model part of the adapted model representing anatomy outside of the field of view.

8. The system according to claim 1, wherein the segmentation subsystem is further configured for, after applying the model to the image data of the medical image, applying the adapted model to the image data of a second medical image having another field of view, thereby further adapting the adapted model, the second medical image showing at least the second part of the anatomical structure, the second model part of the adapted model having been adapted to the second part of the anatomical structure in the second medical image.

9. The system according to claim 1, wherein the first model part represents an anatomical part of the anatomical structure shown only partially in the medical image, and wherein the segmentation subsystem is further configured for:
   estimating a local transformation for adapting the first model part to the medical image; and
   in estimating the local transformation, applying a regularization term accounting for the anatomical part being only partially shown in the medical image.

10. The system according to claim 9, wherein the regularization term provides a stronger regularization when less of the anatomical part is shown in the medical image.

11. The system according to claim 9, wherein the regularization term provides a Tikhonov regularization.

12. A system for model-based segmentation, the system comprising:
   an image interface for accessing image data representing a medical image of a patient, the medical image showing a first part of an anatomical structure of the patient while not showing a second part of the anatomical structure;
   a data storage comprising model data defining a model for segmenting a type of the anatomical structure; and
   a segmentation subsystem for performing a model-based segmentation of the medical image by applying the model to the image data of the medical image, the model-based segmentation providing an adapted model having:
   i) a first model part having be adapted to the first part of the anatomical structure in the medical image of the patient, and
   ii) a second model part representing the second part of the anatomical structure not having been adapted to a corresponding part of the medical image;
   the segmentation subsystem being configured for generating metadata identifying the first model part to enable the first model part to be distinguished from the second model part in a further processing of the adapted model, and
   the segmentation subsystem being further configured for adapting the model to the second part of the anatomical structure by, after or during the first model part being adapted to the first part of the anatomical structure in the medical image of the patient, extrapolating a shape of the first model part to the second model part of the model.

13. The system according to claim 12, wherein performing the extrapolation comprises minimizing an internal energy term defined based on a relationship existing between vertices and/or edges of the first model part and the second model part.

14. A method for model-based segmentation, the method comprising:

accessing image data representing a medical image of a patient, the medical image showing a first part of an anatomical structure of the patient within a field of view of the medical image while not showing a second part of the anatomical structure outside the field of view of the medical image;

providing model data defining a model for segmenting a type of anatomical structure;

performing a model-based segmentation of the medical image by applying the model to the image data of the medical image, the model-based segmentation providing an adapted model having:
i) a first model part, specific to the patient, corresponding to the first part of the anatomical structure in the medical image of the patient, and
ii) a second model part representing the second part of the anatomical structure not having been adapted to a corresponding part of the medical image; and generating metadata identifying the first model part to enable the first model part to be distinguished from the second model part in a further processing of the adapted model.

15. A non-transitory computer readable medium storing instructions that, when executed by a processor system, cause the processing system to execute steps of the method according to claim 14.

* * * * *